UNITED STATES PATENT OFFICE.

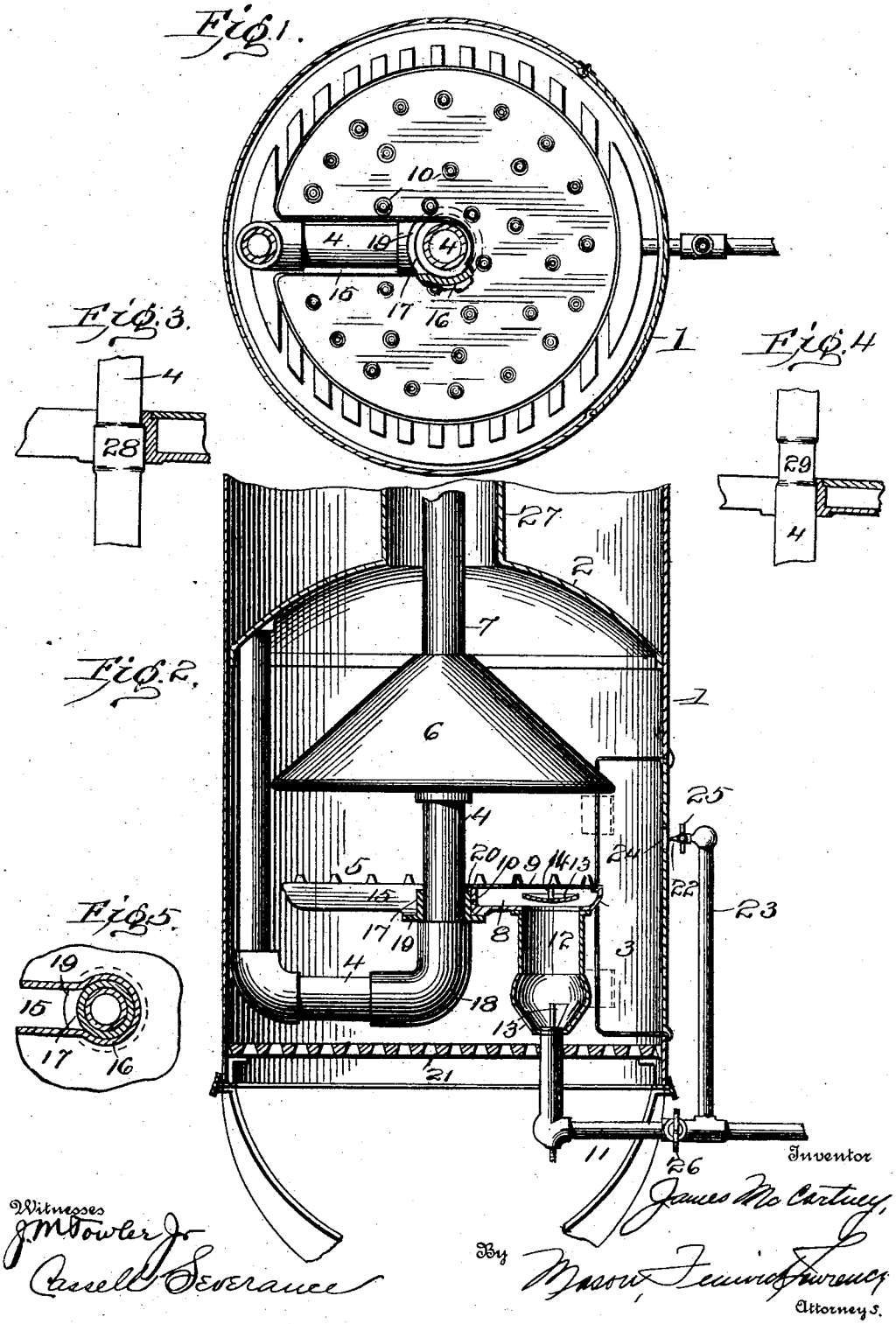

JAMES McCARTNEY, OF CHICAGO, ILLINOIS.

WATER-HEATER.

No. 796,924.　　　　　Specification of Letters Patent.　　　　　Patented Aug. 8, 1905.

Application filed August 3, 1904. Serial No. 219,367.

*To all whom it may concern:*

Be it known that I, JAMES McCARTNEY, a citizen of the United States, residing at Chicago, in the county of Cook and State of Illinois, have invented certain new and useful Improvements in Water-Heaters; and I do hereby declare the following to be a full, clear, and exact description of the invention, such as will enable others skilled in the art to which it appertains to make and use the same.

This invention relates to improvements in water-heaters, and has particular reference to heaters which are adapted for heating water contained in boilers or other like receptacles.

The object in view is the provision of a burner susceptible of ready bodily application to and removal from a support positioned at a point making its approach difficult.

With this and further object in view the invention comprises, in combination with a support, a burner formed with a notch adapted to inclose said support and means for locking said burner against lateral removal from said support, the burner being free to be moved vertically out of engagement with said locking means.

It further comprises a centrally-apertured burner and a notch leading from the periphery of the burner to said aperture, the notch being of less width than the diameter of the aperture.

The invention also comprises certain other novel constructions, combinations, and arrangements of the parts, as will be hereinafter fully described and claimed.

In the accompanying drawings, Figure 1 is a transverse horizontal sectional view taken through the lower end of a boiler-shell and above the burner located therein, the said burner being shown in elevation. Fig. 2 is a central vertical sectional view through the heating apparatus, the lower portion of a boiler being shown as inclosing the same. Fig. 3 is a detail view showing the supporting-pipe for the burner formed with an enlarged portion made upon the pipe. Fig. 4 is a similar detail view showing the supporting-pipe for the burner provided with a reduced portion for facilitating the removal and replacement of the burner. Fig. 5 is a detail sectional view through the central portion of the burner.

The heater forming the subject-matter of the present invention is capable of use for heating purposes in many places, but is especially well adapted for use in connection with a water-containing receptacle, the said heater being used for raising the temperature of the water as found desirable. The device is particularly well adapted for use in connection with the ordinary hot-water boiler of the kitchen, and in the drawings the heater has been shown as applied to an improved form of household boiler.

The form of the boiler illustrated in the drawings is like that shown and claimed by me in an application for a patent dated December 12, 1903, and Serial No. 184,875, in which the boiler is formed with a heater-inclosing shell extension 1. The shell is formed by extending the inclosing walls of the boiler below the bottom 2 thereof, and when used in connection with my improved removable burner, as will be hereinafter described, the said shell 1 is provided with a door 3 in the side thereof for normally closing and opening of sufficient size to permit the insertion or removal of the said burner. The door may be hinged or otherwise mounted and can be held in its closed position by any suitable latch or locking means. (Not illustrated.) The support for the burner of the heater enters the closure formed by the shell and is preferably a feed-water pipe, as 4, which connects with the interior of the boiler and extends downwardly and horizontally beneath the burner 5. The said pipe 4 is also extended upwardly through the central portion of the burner and thence through the boiler toward the top thereof. Above the burner any suitable water-spreading receptacle, as 6, may be employed, the said water-spreading receptacle receiving the water to be heated from the pipe 4. The heated water passes from the spreader through piping 7, by which it is led to any desired point for use, or it may be stored in the body portion of the boiler. The burner, as shown, preferably consists of a shallow disk-shaped receptacle 8, which may, if desired, be formed with a removable top or cover 9. The top or cover 9 is formed with a series of outlets or small nozzles 10, through which the gas or other fuel is discharged for forming the heating-flame. The gas which is usually employed with this burner is admitted to the burner through the supply-pipe 11, which enters the lower end of a mixing-chamber 12. The mixing-chamber 12 is formed with air-inlet openings 13, made of a suitable size to admit sufficient air for an economical consumption of the gas. The gas passes upwardly through the mixing-chamber 12 and enters the receptacle 8 through the aperture in the bottom thereof. In order to prevent the gaseous mixture from passing directly through the burner and through the nozzles only which are opposite the mixing-chamber, I employ a spreader arranged within the burner and extending over the open end of the mixing-chamber 12. In the drawings I have illustrated a simple and effective spreader 13, which consists in a suspending shank or stem 14, engaging the cover 9 of the burner, and an annular body portion, preferably of a convex shape upon its lower surface. By the use of this spreader the gaseous mixture is spread evenly throughout the burner and substantially an even flow of gas escapes through the nozzles 10 for ignition.

The burner is formed with a notch or recess 15, extending inwardly from the periphery thereof to the central portion of said burner. The recess is made of sufficient width to permit the burner to be slipped upon the pipe 4. The inner end of the slot or recess is, however, slightly enlarged, as at 16, and an enlarged locking means is employed in connection therewith and carried by the pipe 4 for preventing the displacement of the burner when the said burner rests upon the locking means. There are several ways in which the burner may be locked upon the pipe against lateral movement; but I have illustrated for this purpose and preferably use a locking-collar 17. The collar fits upon the pipe 4 and generally rests upon the elbow or other pipe connection, as 18, as shown in Fig. 2. The locking-collar 17 is preferably formed with an annular flange 19, upon which the lower surface of the burner 8 rests. The collar 17 is of such a diameter that it will fit snugly within the enlargement 16, but of too great a diameter to enter and pass through the slot or recess 15. It will thus be seen that it is impossible to withdraw the burner from the collar 17 when in the position illustrated in Fig. 2. When the burner is to be removed from the boiler, it is lifted a short distance until the lower surface thereof is above the upper edge of the collar, when the burner can be moved laterally from about the pipe 4. The collar 17 need not be made of the full height of the burner, and an overhanging portion 20 may be formed above the recess 16, the opening at the top at the center of the burner being of a diameter equal to the width of the recess or notch 15. It will be apparent, of course, that the recess 16 may be made to extend entirely through the burner from top to bottom and that the collar 17 may also be made of proportionate height.

Below the burner and extending across the lower portion of the shell 1 is a grate 21, made in any suitable manner and provided with ample slots or openings, through which a draft may be had for maintaining a combustion of the fuel within the heating-chamber. The supply-pipe 11 preferably extends downwardly through the grate and thence laterally beneath the lower edge of the shell 1. The said pipe may be connected with any suitable source of fuel or gas supply in the usual manner. In order to easily light the burner within the shell 1, I employ a pilot-burner 22, carried by the upper end of a branch pipe 23. The pilot-burner is so positioned as to direct a pilot-flame laterally through the opening 24, formed in the shell 1 and at a suitable distance above the nozzles of the burner to insure the lighting of the gaseous fuel escaping through the same. The flow of gas through the pilot-burner may be controlled by an ordinary stop-cock 25, and the flow of gas to the burner 5 is controlled by a stop-cock 26, located in the supply-pipe 11.

The burner above described is possessed of special advantages where the heater is applied to boilers in which the piping at the lower end thereof is quite close to the boiler and in which very little room is left for the placing and removing of such a burner. Very little room is required in putting my burner in position and removing it, for it is only necessary to elevate the burner the height of the locking enlargement or collar 17 to free the burner therefrom, when it can be taken out laterally through the door in the side of the shell. Of course the supply-pipe 11 is first disconnected from the mixing-chamber 12 by unscrewing it therefrom. The removal of this burner can also be accomplished without the coupling or uncoupling of the water-pipes, which is a point of considerable advantage in a mechanism of this character. It is of advantage in using household boilers of this kind in certain sections of the world to be able to remove the gas-burner and employ fuels of other kinds beneath the boiler for heating it. The grate 21 is in proper position to support such fuel, which may be introduced through the door 3 in the shell. The boiler is provided with a flue 27, extending upwardly through the boiler for permitting of the escape of the products of combustion when the boiler is heated either by the gas-burner or by other fuel which may be placed upon the grate 21. It will be seen that it is a simple operation to convert the heater from a gas-consumer to a consumer of other fuels, for it is only necessary to disconnect and lift the burner out through the door 3 in order to leave the combustion-chamber within the shell in readiness for such other fuel. When it is desired to employ the gas-burner again, it can be as easily and readily put in position, the burner being inserted through the door 3 and placed about the pipe 4 until the inner end of the slot or notch 15 is in position to receive the collar 17. The burner will then be lowered to the position shown in Fig. 2, after which the supply-pipe 11 can be connected with the lower end of the mixing-chamber 12.

While I have shown a loose collar 17 as constituting the locking means for holding the burner upon the pipe 4, it will be apparent that a rigid collar may be secured to the said pipe and also that the said collar need not be provided with the annular flange 19, as shown and described. It will further be evident that instead of using a collar a pipe may be enlarged at the point corresponding with the position of the collar, such enlargement, as 28, being shown in Fig. 3 of the drawings. The enlargement will of course not pass through the greater portion of the slot or recess in the burner, but will fit in the enlarged end thereof at the center of the burner. As shown in Fig. 4, the supply-pipe 4 may be reduced, as at 29, for a short distance above the part of said pipe which is normally surrounded by the burner. In each of these cases the operation of removing and replacing the burner is the same as described with respect to Figs. 1 and 2—that is to say, the burner is lifted to a point on the pipe 4 where it can be moved laterally, the slot or recess facilitating the movement, and when the pipe occupies a central position with respect to the burner the said burner may be dropped to its normal position, where it will be locked against accidental movement laterally.

The burner described will be seen to be exceedingly simple in structure and capable of adaptation for use in various positions and also readily mounted upon a central support.

Having now described my invention, what I claim as new, and desire to secure by Letters Patent, is—

1. A burner comprising a body portion formed with an aperture for receiving a support and a notch leading from the periphery of the body portion to the aperture, the notch being of less width than the diameter of the aperture.

2. A burner comprising a body portion formed with a central support-engaging aperture, and a notch extending from the periphery of the body portion to the aperture, said notch being of less width than the diameter of the aperture.

3. A burner comprising a body portion formed with an aperture and a notch leading from the periphery of the body portion to said aperture for engaging a support, and shouldered portions at the inner end of said notch.

4. In a water-heater, the combination with a water-pipe, of a burner surrounding the same, and formed with an aperture and a notch leading thereto, and means of greater diameter than the width of the notch fitting within said aperture for retaining the burner against lateral movement.

5. In a water-heater, the combination with a supporting-pipe, of a heater surrounding the same and formed with a central opening, a notch leading from said opening to the periphery of the burner, the said notch being of less width than the diameter of the aperture, and means upon the pipe of greater diameter than the width of the notch fitting in the said aperture.

6. A burner comprising a body portion formed with an inwardly-extending edge opening for engaging a support, a portion of the opening being contracted for holding the burner against lateral movement upon the support.

7. In a water-heater, the combination with a water-pipe, of a sleeve or bushing surrounding the same, a burner formed with an aperture surrounding said sleeve or bushing, and a notch leading from said aperture to the periphery of the burner and of a width greater than the diameter of said pipe, but less than the diameter of said sleeve or bushing 8. In a water-heater, the combination with a water-pipe, of a sleeve or bushing surrounding the same, a flange on the lower end of said sleeve or bushing, a burner formed with an aperture surrounding said sleeve or bushing, and a notch leading from said aperture to the periphery of the burner.

9. In a water-heater the combination with a support, of a burner having a notch formed therein, a locking means interposed between the burner and support and engaging the walls of the notch for preventing lateral movement of the burner, with respect to said support, the burner being free to move vertically out of engagement with the locking means.

10. In a water-heating apparatus, the combination with a support, of a hollow burner mounted thereon having a centrally-extending slot for permitting the placing of the burner on the support, a mixing-chamber depending from the burner and connected with a fuel-supply, and an annular spreader mounted within the burner above the mixing-chamber for evenly delivering the gaseous mixture to the various parts of the burner.

11. In a water-heater, the combination with a support, of a burner capable of fitting around the same and provided with an opening extending inwardly from the edge thereof, and locking means interposed between the support and the inner end of the said opening for retaining the burner against lateral removal, said burner being free to move vertically out of engagement with said locking means.

12. In a water-heater, the combination with a feed-water pipe, of a heater carried thereby and formed with a notch for facilitating the positioning and removal of the burner, and locking means carried by the pipe for preventing withdrawal of the burner therefrom while the burner is in the plane of the locking means, the burner being free to be moved out of such plane and being adapted to be thus moved for being freed from retention by the locking means.

13. In a heater the combination with a support, of a burner surrounding the same and formed with an aperture and a notch leading thereto, and a locking member within said aperture engaging the walls thereof and the support, for retaining the burner against lateral movement.

14. In a heater, the combination with a support, of a burner surrounding the same and formed with an aperture and a notch leading thereto, and a locking member of greater size than the width of the notch removably fitting within said aperture for retaining the burner against lateral movement with respect to said support.

15. In a heater, the combination with a support, of a burner surrounding the same and formed with an aperture and a notch leading thereto, the aperture producing a shoulder at the inner end of the notch, and means on said support engaging said shoulder for preventing lateral movement of said burner.

16. In a heater, the combination with a support, of a burner formed with an aperture surrounding the same and of larger diameter than said support, said burner being formed with a notch leading to said aperture, the notch being of greater width than the diameter of said support and of less width than the diameter of said aperture, and means within the aperture for preventing lateral movement of the burner with respect to the support.

17. In a heater, the combination with a support, of a burner formed with an aperture surrounding said support, the said burner being formed with a notch leading to said aperture, the aperture being of greater diameter than the support and the notch being of greater width than the diameter of the support but of less width than the diameter of the aperture, and means surrounding said support and snugly fitting said aperture for preventing lateral movement of the burner with respect to the support.

18. In a heater, the combination with a central, upright support, of a burner having an opening extending into it from the edge and adapted to fit about said support, removable locking means interposed between the support and the burner at the inner end of the opening, and means formed upon the burner adapted to engage said locking means for preventing lateral displacement of the burner.

19. In a heater, the combination with a support, of a burner formed with an inwardly-extending edge opening adapted to fit about said support, locking means surrounding the support and interposed between the same and the burner at the inner end of the opening, and means formed upon the burner adapted to engage said locking means for preventing lateral displacement of the burner.

20. In a heater the combination with a support, of a burner having an edge opening adapted to fit upon the said support, and locking-shoulders formed in the said opening by contracting its outer portion, the said locking means preventing the lateral displacement of the burner.

In testimony whereof I affix my signature in presence of two witnesses.

JAMES McCARTNEY.

Witnesses:
W. F. STICKNEY,
H. M. CAMERON.